March 31, 1953 O. W. OERMAN 2,633,069
FRAME CONSTRUCTION FOR PLOWS
Filed July 24, 1947 2 SHEETS—SHEET 1

INVENTOR
OREY W. OERMAN
BY
ATTORNEYS

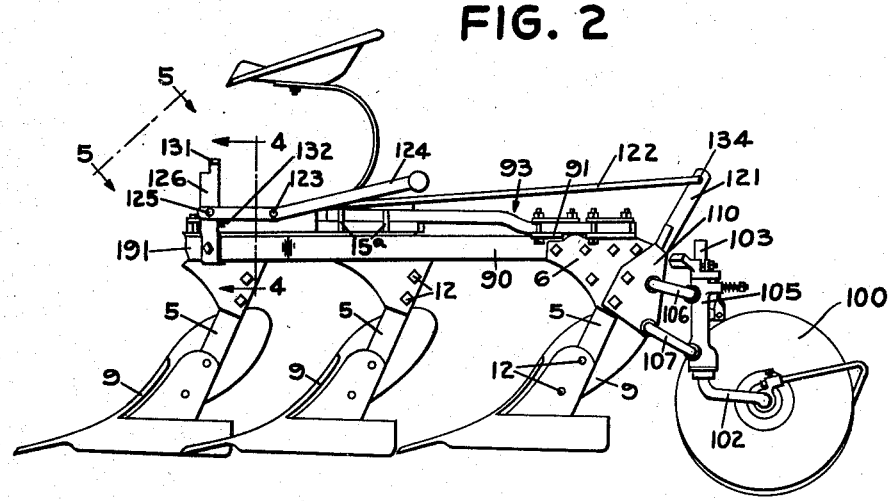
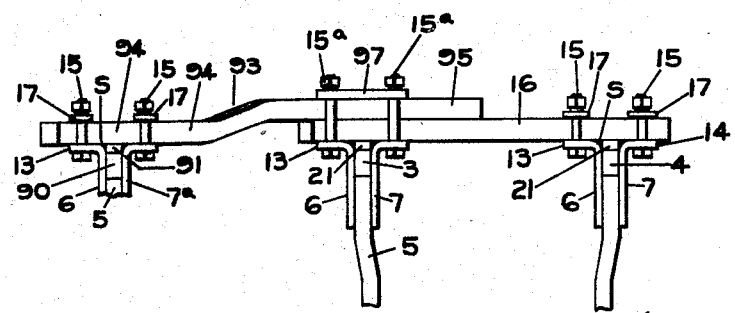
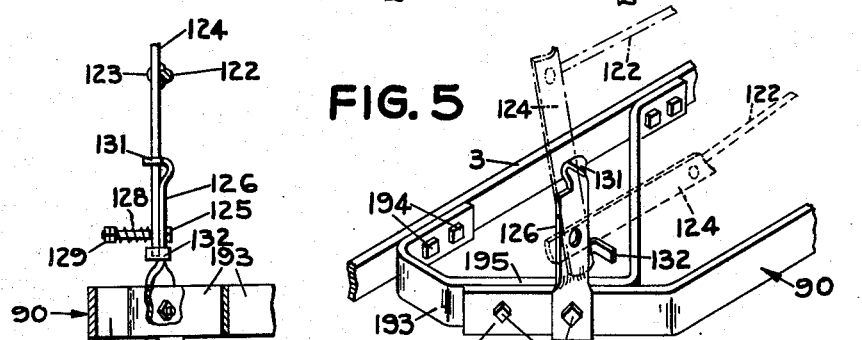

Patented Mar. 31, 1953

2,633,069

UNITED STATES PATENT OFFICE 2,633,069

FRAME CONSTRUCTION FOR PLOWS

Orey W. Oerman, Moline, Ill., assignor to Deere & Company, Moline, Ill., a corporation of Illinois Application July 24, 1947, Serial No. 763,289

1 Claim. (Cl. 97—104)

The present invention relates generally to agricultural machines and is more particularly concerned with ground working implements, such as plows and the like.

The object and general nature of the present invention is the provision of a new and improved plow of the convertible type, especially adapted to be converted from a plow having plow bottoms of one size to a plow having plow bottoms of another size, particularly in conjunction with means arranging the plow to use different sizes of plow bottoms.

A further feature of this invention is the provision of new and improved frame means embodying a rear brace member formed as relatively adjustable bracing parts accommodating not only adjustment of one of the plow bottoms but also the disconnection of one of the bottoms to reduce the size of the plow.

Still further, another feature of this invention is the provision of new and improved means for raising and lowering the rear furrow wheel of the plow, especially constructed, so that when in operating position the weight of the rear furrow wheel is available to resist upward displacement of the plow frame.

These and other objects and advantages of the present invention will be apparent to those skilled in the art after a consideration of the following detailed description, taken in conjunction with the accompanying drawings, in which:

Figure 2 is a side view of the plow shown in Figure 1.

Figure 3 is a rear view, looking forwardly, of the plow shown in Figure 1.

Figure 4 is a sectional view taken generally along the line 4—4 of Figure 2.

Figure 5 is a fragmentary perspective view of the latch for the rear wheel raising and lowering lever.

Figure 1:
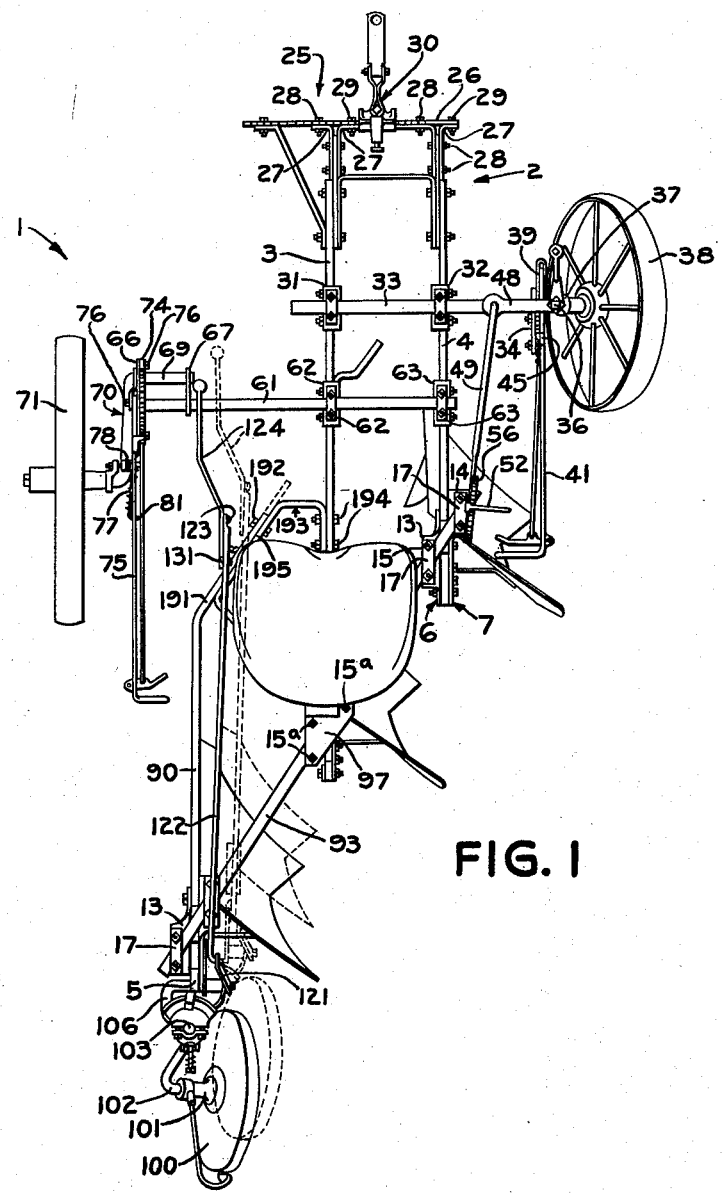
Figure 1 is a plan view of a plow embodying the principles of this invention, showing in dotted lines the manner in which the rearmost plow beam may be adjusted relative to the other plow beams.

Referring now more particularly to Figures 1, 2 and 3, the plow, indicated in its entirety by the reference numeral 1, comprises a frame 2 which includes a pair of plow beams 3 and 4, the latter being shorter than the plow beam 3. The rear end of each of the plow beams 3 and 4 is connected to a shank or standard 5, which preferably is of flat bar stock like the associated plow beam, by means of a pair of bracket plates 6 and 7. These bracket plates are identical, comprising generally triangular apertured plates that are bolted to the upper end of the associated standard and the rear end of the associated horizontal beam so as to form a firm rigid connection between the standard and beam bars. A plow bottom 9 is fixed to the lower end of each of the standards or shanks 5. The lower end of each of the standards, which is the part to which the associated plow bottom is connected, as by bolts 12, is offset laterally, and since the standards 5 are straight members, they may be connected to the horizontal plow beams 3 and 4 in either of two positions, one with the offset portions disposed toward one another or with the offset portions arranged away from one another, thereby providing for plow bottoms of two different sizes.

Each of the bracket plates 6 and 7 is provided with a laterally outwardly directed flange, the bracket 6 being formed with a flange 13 which is disposed well rearwardly while the flange 14 on the companion bracket plate 7 is spaced well forwardly. These flanges are apertured to receive pairs of bolts 15 by which a straight diagonally rearwardly extending square bracing bar 16 may be secured to the rear portions of the plow beams 3 and 4, each pair of bolts receiving an apertured clamping cap 17. As best shown in Figure 3, the flanged portions of the bracket plates 6 and 7 lie slightly above the upper edge of the associated plow beam, providing a space S which forms a socket receiving an abutment member 21 that is secured, preferably by welding, to the underside of the diagonal brace bar 16. Thus, when the clamping bolts 15 are tightened not only is the bar 16 firmly fixed to the flanged portion of the bracket plates but, additionally, the abutment 21 at each end of the diagonal bar on the associated sockets S receiving the abutment members serve to hold the rear portions of the plow beams rigidly in laterally spaced relation.

The front ends of the plow beams 3 and 4 are rigidly connected together by a hitch structure 25 that includes a transverse bar 26 and a plurality of pairs of angle members 27 bolted, as at 28 and 29, to the front ends of the plow beams 3 and 4 and the transverse bar 26. A draft member 30 is adjustably mounted on the transverse bar 26 and receives the rear end of a tongue or the like by which draft animals may be hitched to the plow.

The intermediate portions of the plow beams 3 and 4 carry clamping brackets 31 and 32 by means of which a transverse wheel supporting bar 33 is rigidly connected thereto and, when the clamping members are loosened, the bar 33 may be shifted laterally inwardly or outwardly, as desired. The laterally outer end of the bar 33 carries a bracket 34 to which a generally vertically disposed sleeve member is rigidly fixed. The sleeve section receives the spindle 36 of a front furrow wheel carrying member 37, the lower end of the latter member being turned outwardly and downwardly to receive a furrow wheel 38. The spindle 36 is adjustable vertically by means of a hand lever 41 pivotally connected to a forwardly extending portion 39 formed on the bracket 34, the lever 41 being connected by means of a link to a collar that is fixed to the upper portion of the spindle 36. The lever 41 is held in any position of adjustment by means of detent mechanism 45 cooperating with a notched portion of the bracket 34.

An inwardly extending arm 48 is non-rotatably secured to the upper end of the spindle 36 and receives the forward end of a link 49, the rear end of which is pivoted to a hand lever 52 which is swingably connected at its lower end with the rear portion of the plow beam 4 by any suitable means, such as a clip fixed to the right hand clamping cap 17. A sector 56 is fixed to the rear end of the link 49 and the hand lever 52 carries suitable detent mechanism whereby, when the detent mechanism is released, the lever 52 may be employed for steering the wheel 38 about the axis of the spindle 36, and when the detent mechanism 57 is engaged with the sector, the front furrow wheel 38 is locked in the desired position.

A second transverse bar 61 is rigidly connected to the intermediate portions of the plow beams 3 and 4 by clamping brackets 62 and 63, and the bar 61 may, like the bar 33, be fixed to the plow beams in different positions of lateral adjustment. A bracket 66 is rigidly fixed to the laterally outer end of the bar 61, and a companion bracket plate 67 is welded or otherwise fixed to the bar 61 laterally inwardly of the bracket 66. These brackets are apertured to receive the laterally inwardly directed portion 69 of a crank axle 70, upon the laterally outturned end of which a land wheel 71 is mounted for rotation. A sector 74 is carried by the bracket 66 and cooperates with detent mechanism carried on a hand lever 75 that is pivotally mounted, as at 76, to the bracket 66. A link 77 connects the hand lever 75 with a lower portion of the crank axle 70. Preferably, the lower end of the link 77 extends downwardly through an aperture in a socket 78 clamped to the lower portion of the crank axle 70, and a compression spring is disposed about the link 77 between the socket 78 and an abutment formed on the upper end portion of the link 77, the upper end of which is pivoted, as at 81, to the hand lever 75. Swinging the hand lever 75 upwardly or downwardly serves to raise or lower the frame relative to the land wheel 71.

The plow frame 2 includes a detachable third plow beam 90, the forward end of which is bent to extend laterally inwardly and forwardly, as indicated at 191. This end portion of the beam 90 is apertured to receive bolts 192 by which the beam may be attached to an angle bracket 193 fixed, as by bolts 194, to the rear portion of the left hand plow beam 3. The angled portion 195 of the bracket 193 receiving the plow beam 90 is provided with a plurality of apertures permitting the beam 90 to be disposed in different positions laterally relative to the plow beams 3 and 4. The rear end of the detachable plow beam 90 carries a pair of brackets 6 and 7, like the plow beams 3 and 4, by which a shank or standard 5 is connected thereto. The bracket plates 6 and 7 for the third plow beam 90 have flanged sections 13 and 14 as described above which provide a socket S receiving an abutment 91 fixed to the rear portion of a second bracing bar 93. As best shown in Figure 3, this second bracing bar includes a rear section 94 carrying the abutment 91 and a forward or offset section 95 which overlies the rear portion of the first mentioned brace member 16. The bolts 15a extending through the flanges of the bracket plates 6 and 7 for the plow beam 3 are longer than the bolts 15 mentioned above and extend upwardly through an apertured cap plate 97 which overlies the offset portion 95 of the second brace member 93. Caps 17 and bolts 15 connect the rear end of the second brace member 93 with the rear of the third beam 90, and the bolts 15a may be loosened when the position of the beam 90 is changed relative to the other plow beams so as to accommodate movement of the brace member 93 along the forward brace member 16. After the desired adjustment has been effected the bolts 15a are tightened.

The rear end of the plow is supported on a rear furrow wheel 100 having a hub section 101 that is journaled for rotation on the laterally turned end 102 of a rear furrow wheel spindle 103, the major portion of which is extended substantially vertically and mounted for rocking movement in a sleeve section 105 mounted by means of non-parallel links 106 and 107 on the rear end of the third beam 90. Preferably, to this end, an extension bracket 110 is bolted to the left hand bracket plate 6 and an extended right hand bracket plate 7a is bolted to the rearmost shank 5 and the rear end of the plow beam 90. The rear portion of the bracket plate 7a and the auxiliary plate 110 are apertured and provided with bearing members receiving the forward ends of the links 106 and 107, whereby the rear furrow wheel 100 may be raised and lowered relative to the plow frame. This is preferably accomplished by means of an arm 121 fixed to the right side of the upper link 106, the upper end of the arm 121 being apertured to receive the rear end of a thrust link 122, the forward end of which is pivoted, as at 123, to a hand lever 124. The lower end of the hand lever 124 is mounted on a pivot bolt 125 which is carried by a bracket 126 that is fixed to the diagonal or laterally bent portion 191 of the plow beam 90. The pivot bolt 125 is extended laterally and a compression spring 128 is mounted on the bolt 125 and is confined between a pair of lock nuts 129 on the end of the bolt 125 and the lower end of the lever 124. The upper end of the bracket 126 is formed with a laterally outwardly extending lug 131 having angled front and rear edges. As best shown in broken lines in Figure 5, when the plow is in working position and the bottoms lowered with respect to the furrow wheel 100, the lever 124 lies just forward of the lug 131, and when the plow is raised into its operative position (dash and dot lines, Figure 5), the rear wheel 100 is lowered by swinging the hand lever 124 rearwardly and downwardly, into a position (Figure 2) such that the lever 124 engages a lug 132 that is fixed to and forms a part of the bracket 126. As best shown in Figure 2, the parts are so arranged that in this position the pivot 123 falls below a line joining the bolt 125 and the end 134 of the link 122 that is pivotally connected to the upper end of the arm 121, Since the lower part of the arm 124 and the link 122 thus lie in an overcenter relation, the plow is locked in its raised or transport position. When in working position and when the lever 124 lies forward of the lug 131, the wheel 100 is prevented from dropping down into a hole by virtue of the hand lever 124 being maintained in its forward position by the lug 131. However, whenever it is desired to raise the rear end of the plow, all that the operator has to do is to displace the lever 124 laterally outwardly so as to clear the lug 131 and then swing the hand lever 124 rearwardly.

The beam 90 and associated parts may be readily removed from the plow frame at any time without requiring that the plow beams 3 and 4 be disconnected. When the beam 90 is removed, the rear furrow wheel 100, together with its associated parts, such as the attaching brackets 110 and 7a, are moved forwardly and connected to the rear end of the plow beam 3. This converts the three bottom plow into a two bottom plow, and to accommodate this conversion the rear clamping brackets 62 and 63 are loosened to permit shifting the land wheel 71 laterally inwardly to the desired position.

Mention was made above of the fact that the two forward plow beams may be arranged in different positions of adjustment, depending on the position of the offsets of the two forward shanks 5. If, for example, the plow is arranged as a three bottom plow and it is desired to change the bottoms to a different size, all that it is necessary to do is to reverse the two forward shanks 5 to accommodate the change in the plow bottoms, loosen the bolts 15a, and then shift the rear or third beam 90 and the rear beam section 93 laterally inwardly or outwardly, relative to the angle bracket 193 and the forward bracing member 16, to bring the rear or third bottom into the desired position relative to the first two bottoms, and after this adjustment has been made the bolts 15a are tightened to securely and rigidly fasten the brace members 16 and 93 together, and the bolts 192 are placed in the proper openings 195 in the angled sections 195 of the bracket 193. The angle section 195 extends generally parallel to the forward brace member 16, and hence when adjusting the rear plow bottoms toward or away from the other bottoms, such adjustment is effected in line with the two forward plow bottoms, thus making it unnecessary to change the longitudinal position of either of the plow beams 3 and 4.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

In a plow or the like, a pair of beams, a diagonally disposed bracing member connected with the rear ends of said beams, a third beam adapted to be detachably connected with said pair of beams at one side of said pair of beams, a bracket connected to the intermediate portion of one of said beams and extending diagonally outwardly and rearwardly therefrom at said one side of the pair of beams, a second bracing member fixed at its rear end to the rear end of said third beam and extending diagonally forwardly and inwardly toward said one side of said pair of beams at an angularity corresponding to the angularity of said first mentioned bracing member and said bracket, means at the forward end of said third beam and extending forwardly and inwardly toward said one side of said pair of beams at the same angle as that of said second bracing member and thereby corresponding to the angularity of said bracket and said first bracing member, means for detachably connecting said means with said bracket, means for detachably connecting said bracing members to one another, both of said detachably connecting means accommodating adjustment of said third beam toward and away from said pair of beams in a direction corresponding to the angularity of said bracket and first bracing member, said second bracing member including a front portion offset upwardly relative to the rear portion thereof, the amount of offset being substantially equal to the vertical dimension of said first bracing member, whereby when the offset portion is connected to the upper side of said first bracing member the rear part of said second bracing member is disposed in longitudinal alignment with said first bracing member, substantially identical plow bottom receiving bracket means connected to the rear end of said third beam and the rear end of the adjacent beam, and ground wheel means connected optionally to either of said bracket means.

OREY W. OERMAN.

REFERENCES CITED

The following references are of record in the file of this patent:

UNITED STATES PATENTS

| Number | Name | Date |
|---|---|---|
| 51,636 | Atwood | Dec. 19, 1865 |
| 435,567 | McMillan | Sept. 2, 1890 |
| 778,982 | Luecke | Jan. 3, 1905 |
| 816,360 | Nelson | Mar. 27, 1906 |
| 1,113,494 | Schlicht | Oct. 13, 1914 |
| 1,214,002 | Bergren | Jan. 30, 1917 |
| 1,451,560 | Welker | Apr. 10, 1923 |
| 1,464,199 | Caughey | Aug. 7, 1923 |
| 1,486,469 | Underwood | Mar. 11, 1924 |
| 1,829,545 | Seaholm | Oct. 27, 1931 |
| 2,179,526 | Strandlund | Nov. 14, 1939 |
| 2,383,022 | Strandlund | Aug. 21, 1945 |
| 2,438,625 | Strandlund | Mar. 30, 1948 |

FOREIGN PATENTS

| Number | Country | Date |
|---|---|---|
| 635,896 | France | Jan. 3, 1928 |